United States Patent
Maki-Ontto et al.

(10) Patent No.: US 9,871,427 B2
(45) Date of Patent: Jan. 16, 2018

(54) STATOR WINDING FOR AN ELECTRIC MOTOR

(71) Applicant: Ingersoll-Rand Company, Davidson, NC (US)

(72) Inventors: Petri Juhani Maki-Ontto, Espoo (FI); Lauri Juhani Salmia, Vantaa (FI)

(73) Assignee: Ingersoll-Rand Company, Davidson, NC (US)

( * ) Notice: Subject to any disclaimer, the term of this patent is extended or adjusted under 35 U.S.C. 154(b) by 790 days.

(21) Appl. No.: 14/212,494

(22) Filed: Mar. 14, 2014

(65) Prior Publication Data

US 2014/0265745 A1   Sep. 18, 2014

Related U.S. Application Data

(60) Provisional application No. 61/801,178, filed on Mar. 15, 2013.

(51) Int. Cl.
*H02K 3/18* (2006.01)
*H02K 11/00* (2016.01)
(Continued)

(52) U.S. Cl.
CPC ......... *H02K 11/0073* (2013.01); *H02K 1/141* (2013.01); *H02K 3/18* (2013.01);
(Continued)

(58) Field of Classification Search
CPC ........ H02K 1/141; H02K 1/146; H02K 1/148; H02K 3/18
See application file for complete search history.

(56) References Cited

U.S. PATENT DOCUMENTS 1,531,152 A * 3/1925 Steen ............... H02G 3/16
                                                    220/3.8
3,963,950 A * 6/1976 Watanabe ......... H02K 3/00
                                                    310/179
(Continued)

FOREIGN PATENT DOCUMENTS

WO           84/03400 A1    8/1984

OTHER PUBLICATIONS

European Patent Office Extended European Search Report cited in EP Patent Application No. 14160279.7, dated Sep. 7, 2018 (8 pages).

*Primary Examiner* — Dang Le
(74) *Attorney, Agent, or Firm* — Taft Stettinius & Hollister LLP

(57) ABSTRACT

An electric motor having a rotor core with a rotatable shaft extending therethrough, and a stator positioned radially outward of the rotor core is disclosed herein. The stator can include at least one pair of first and second coils circumferentially positioned on opposing sides of the rotor. Each pair of the first and second coils includes first and second elements electronically isolated from one another. A first frequency converter is electrically connected to a first conductive wire and a second frequency converter is electrically connected to a second conductive wire. The first conductive wire is wound about the first element of the first coil and the first element of the second coil in series and the second conductive wire is wound about the second element of the first coil and the second element of the second coil in series.

16 Claims, 5 Drawing Sheets

(51) Int. Cl.
  *H02K 1/14* (2006.01)
  *H02K 11/33* (2016.01)
  *H02K 16/04* (2006.01)

(52) U.S. Cl.
  CPC .............. *H02K 11/33* (2016.01); *H02K 16/04* (2013.01); *H02K 2213/12* (2013.01)

(56) References Cited

U.S. PATENT DOCUMENTS

| | | | |
|---|---|---|---|
| 4,562,367 A | | 12/1985 | Kumatani |
| 4,918,347 A | | 4/1990 | Takaba |
| 4,990,809 A | * | 2/1991 | Artus .................... H02K 37/04 310/192 |
| 5,268,609 A | | 12/1993 | Sakashita et al. |
| 5,726,560 A | * | 3/1998 | Eakman .............. F16C 32/0442 310/90.5 |
| 5,903,081 A | | 5/1999 | Haring et al. |
| 6,163,097 A | | 12/2000 | Smith et al. |
| 6,181,048 B1 | | 1/2001 | Smith et al. |
| 6,255,755 B1 | | 7/2001 | Fei |
| 6,288,470 B1 | | 9/2001 | Breit |
| 6,700,276 B2 | | 3/2004 | Hakamata |
| 6,853,107 B2 | | 2/2005 | Pyntikov et al. |
| 7,145,280 B2 | | 12/2006 | Noble et al. |
| 7,288,868 B2 | | 10/2007 | Tamaki et al. |
| 7,545,070 B2 | | 6/2009 | Schach et al. |
| 7,701,101 B2 | | 4/2010 | Al-Khayat et al. |
| 7,888,904 B2 | | 2/2011 | Mularcik |
| 7,902,714 B2 | | 3/2011 | Lee |
| 8,039,982 B2 | | 10/2011 | Scholte-Wassink |
| 8,283,831 B1 | | 10/2012 | Kaminsky et al. |
| 8,319,464 B2 | | 11/2012 | Hsu |
| 2002/0163262 A1 | | 11/2002 | Hsu |
| 2003/0155834 A1 | | 8/2003 | Enomoto et al. |
| 2009/0101449 A1 | | 4/2009 | Breidenstein et al. |
| 2011/0309315 A1 | | 12/2011 | Williams |
| 2012/0223611 A1 | | 9/2012 | Watanabe et al. |
| 2013/0076190 A1 | * | 3/2013 | Jarvinen .................. H02K 3/28 310/198 |

* cited by examiner

STATOR WINDING FOR AN ELECTRIC MOTOR

CROSS-REFERENCE TO RELATED APPLICATION

This application claims the benefit of U.S. Provisional Application No. 61/801,178, filed Mar. 15, 2013, which is incorporated herein by reference in its entirety.

TECHNICAL FIELD

The present disclosure generally relates to an electric motor and more particularly to a stator winding for an electric motor.

BACKGROUND

Stator windings for electric motors are well known to those skilled in the art. Present approaches to stator winding suffer from a variety of drawbacks, limitations, disadvantages and problems including unbalanced rotor loading from some winding configurations under certain operating conditions. Accordingly, there remains a need for further contributions in this area of technology.

SUMMARY

One embodiment of the present disclosure includes an electric motor having a unique stator winding configuration. Other embodiments include apparatuses, systems, devices, hardware, methods, and combinations for the same. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein:

FIGS. 3a through 3c shows a schematic representation of paired coils positioned on opposing sides of a rotor; wherein FIGS. 3a and 3b illustrate a conventional stator winding configuration and FIG. 3c illustrates a stator winding configuration according to one embodiment of the present disclosure;

DETAILED DESCRIPTION OF THE ILLUSTRATIVE EMBODIMENTS

Figure 1:
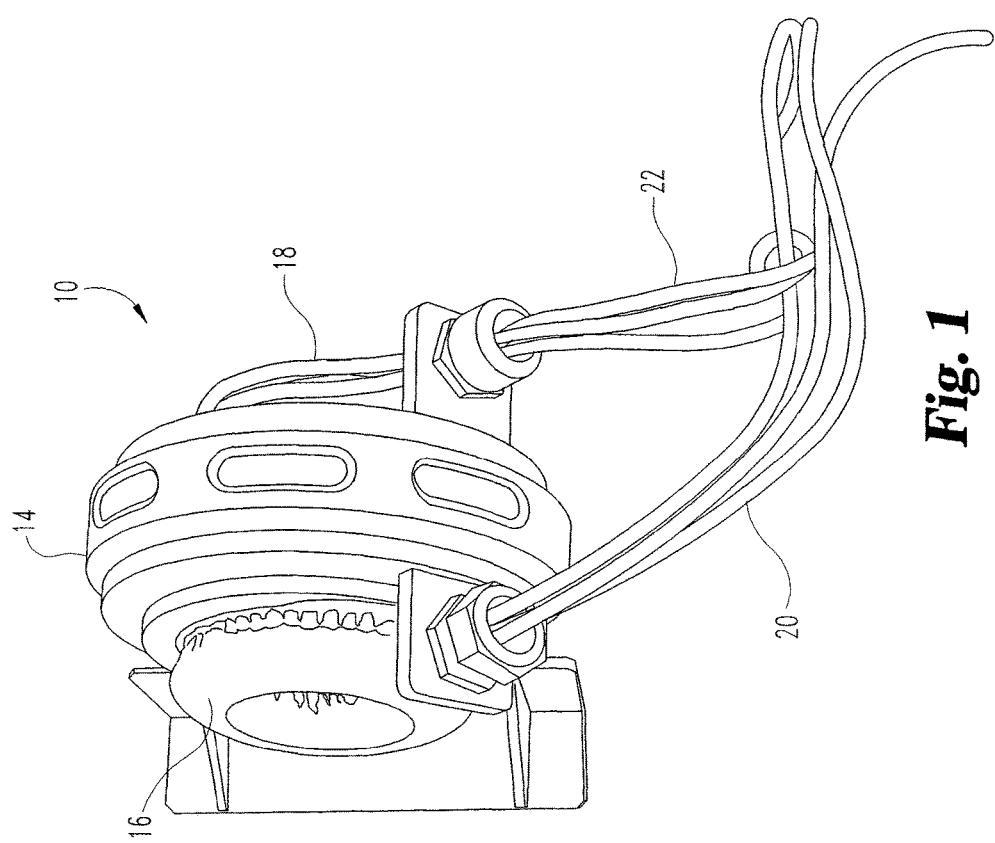
FIG. 1 is a perspective view of an electric motor according to one embodiment of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The proposed stator winding of the present disclosure has features that are especially suitable for windings that have low number of turns and high power/size-ratio for high speed electric motors, although the disclosed stator winding configurations can be used in low speed electric motors as well. The stator winding is generally split into two electrically separated systems that can be powered by two separate frequency converters. In one aspect the windings are connected in parallel such that the motor can operate with just one frequency converter. The split systems are configured such that each phase of the windings consists of two parallel connected branches. All parallel branches are also split in two and connected in series with the corresponding branch halves in the other winding branch. The outputs of the winding are also divided and egress through both ends of the motor to provide efficient use of space in a motor housing.

A slot winding of an electrical machine typically has an optimal range for the number of winding turns in a slot. If the number of turns is too high, the copper cross section of a turn may be too low for the current. If the number of turns is too low, there is a risk that even small deviations in the winding manufacturing cause magnetic asymmetry. This unwanted asymmetry occurs mainly in random-wound machines, where a winding is made of round enameled wires that are difficult to assemble in any controlled order in the slot. As a result, electric current does not flow evenly to parallel winding circuits, causing excessive losses and hot spots in the winding. Theoretically, the asymmetry can be reduced by careful placement of winding wires and shaping of the coil ends. In practice, this is generally infeasible, as there are often over 200 less than 1 mm diameter wires in the slot.

High speed motors typically have a very low number of turns. Magnetic asymmetry can be determined by manufacturing the winding and testing it, but very little can be done to improve windings that do not pass the test. They need to be rewound, which greatly increases the scrap cost of the manufacturing, since the winding is one of the most expensive parts in the motor.

Current difference between branches due to asymmetry can be greatly mitigated by separating the winding branches and feeding them with separate converters. This solution, however, presents its own difficulties. A trip or power loss of a first converter while the second converter stays online can cause high unbalanced radial forces acting on the rotor. These unbalanced radial forces can cause problems with the motor, particularly to mechanical components such as the rotatable shaft, the shaft bearings and the like.

Referring now to FIG. 1, an exemplary electric motor 10 according to one embodiment of the present disclosure is illustrated therein. The electric motor 10 can include a motor housing 14 having a first end 16 and a second end 18. A first set of electrical cables 20 can be connected proximate the first end 16 of the motor housing 14 and a second set of electrical cables 22 can be connected proximate the second end 18 of the motor housing 14. In this exemplary embodiment, the electric motor 10 is operated by a three phase electric power source corresponding to the three individual cables in each of the first and second cable sets 20, 22 respectively. However, an electric motor operating with different phases is contemplated herein. Each set of the electrical cables 20, 22 can be connected to stator windings that are split between first and second end windings 36, 38 (best seen in FIG. 2) that extend to either end 16, 18 of the motor housing 14. The split windings advantageously provide for a symmetrical motor housing 14 that permits more efficient positioning of internal components such as cooling passages or the like. Furthermore, a symmetrical motor housing provides for simplified manufacturing processes which can reduce the cost of producing the electric motor 10.

Figure 2:
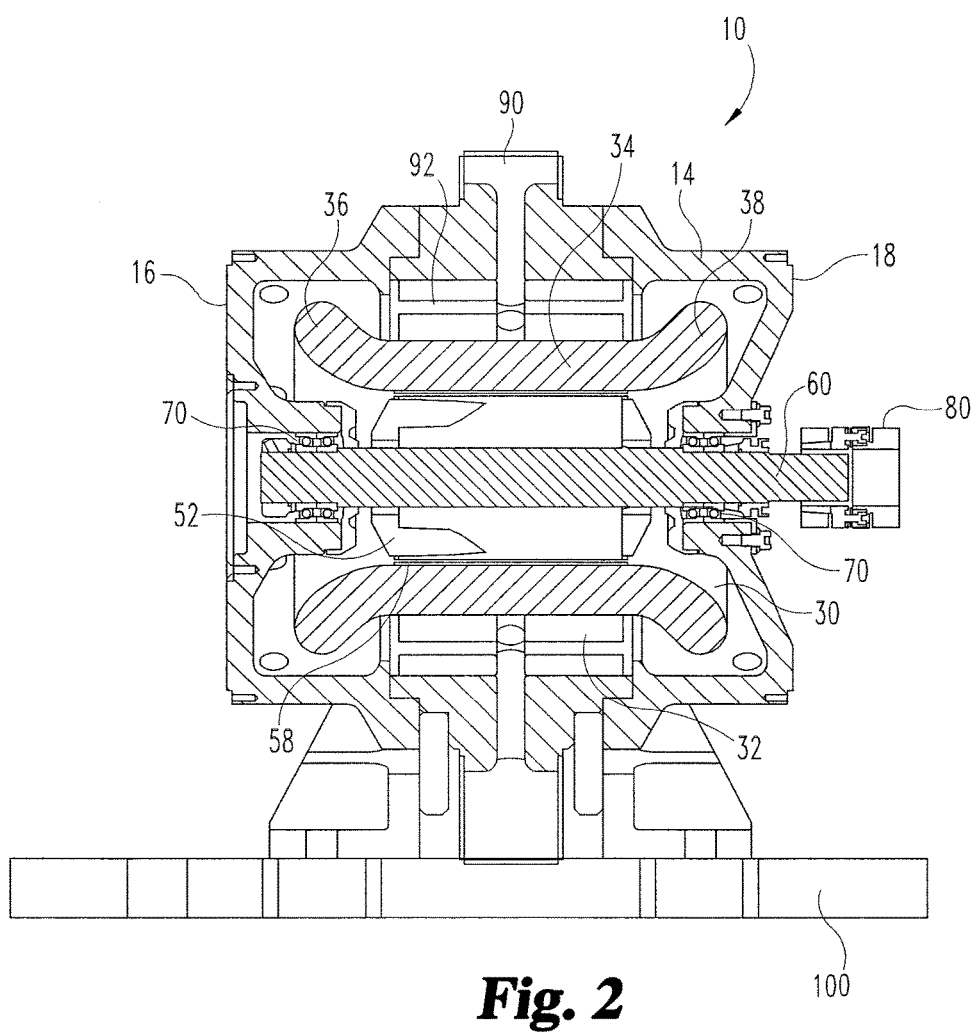
FIG. 2 is a cross-sectional view of an electric motor according to one embodiment of the present disclosure.

Referring now to FIG. 2, a cross-sectional view of the electric motor 10 is illustrated therein. The motor housing 14 holds a stator 30 that is positioned in a substantially symmetrical orientation with respect to the motor housing 14. The motor housing 14 can be formed from materials such as steel, cast iron, aluminum or the like. The stator 30 includes a stator core 32 and a stator winding 34 positioned about the stator core 32. In one form, the stator core 32 can be made from laminated steel sheets or the like. Other manufacturing methods and materials are also contemplated herein. The stator winding 34 according to one exemplary embodiment can be split between a first stator end winding 36 and a second stator end winding 38 so as to connect to the first set of electrical cables 20 and second set of electrical cables 22, respectively. In one form, the stator winding 34 can be formed from insulated copper wire, aluminum wire or the like.

A rotor core 50 can be rotatably positioned within the stator 30 as is conventional. The rotor core 50 can include a rotor end ring 52 positioned on a distal end thereof. The rotor core 50 can be configured as a squirrel cage rotor core as is known to those skilled in the art. Other types of rotor core configurations are also contemplated herein. In one aspect, the rotor core 50 can be made from laminated steel sheets with cast aluminum bars forming portions of the rotor end ring. Other materials and manufacturing configurations are also contemplated by the present disclosure.

An air gap 58 is formed between the stator 30 and the rotor core 50. The air gap 58 is configured to provide minimal height therebetween without actual engagement of the rotating core 50 and the stator 30 during operation. A shaft 60 can extend through the rotor core 50 so as to transmit rotational torque from the rotating core 50 to a driven component (not shown). At least one set of bearings 70 can be positioned between the motor housing 14 and the shaft 60 on either end 16, 18 so as to provide rotational support to the shaft 60. The bearings 70 can include traditional bearings such as ball bearings, roller bearings or sleeved bearings or alternatively can be unconventional such as magnetic bearings or fluid bearings in some applications. A coupling 80 can be connected to one end of the shaft 60 to couple the shaft 60 to a rotationally driven component (not shown). The motor housing 14 can also include a cooling air inlet 90 that fluidly couples with various passageways such as a cooling passageway 92 formed axially through the stator core 32. The cooling passageway 92 can operate to provide cooling fluid such as air to the stator 30 to prevent unwanted heat build-up or even failure of the electric motor 10. The electric motor 10 can be held in position with a base 100 as desired.

Figure 3A:
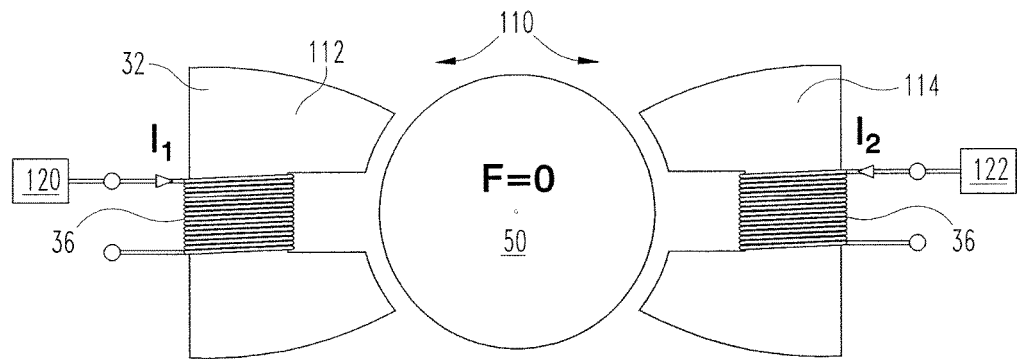
Figure 3B:
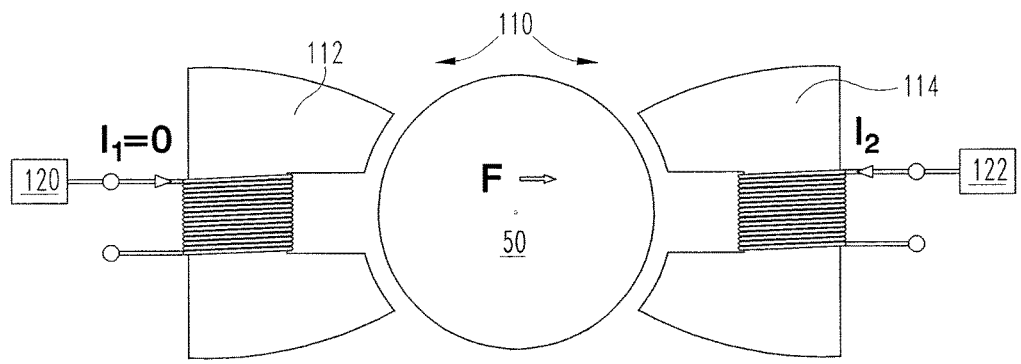
Figure 3C:
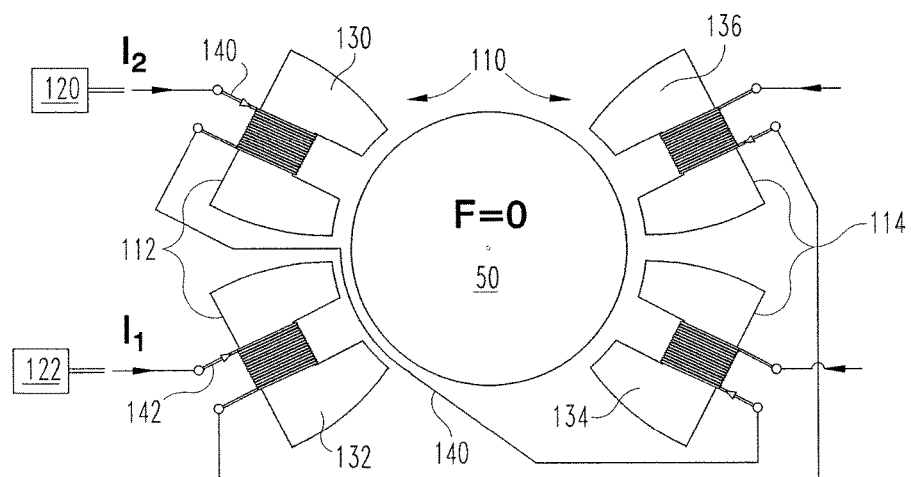

Referring now to FIGS. 3a through 3c, a schematic representation of stator windings are illustrated to show how a net radial force F acting on the rotor core 50 by a coil pair 110 can be affected by a winding configuration that is electrically connected to a first frequency converter 120 and a second frequency converter 122 respectively. As shown In FIG. 3a, a first frequency converter 120 can deliver power with an electric current $I_1$ and a second frequency converter 122 can delivering power with an electric current $I_2$ equal to current $I_1$ through stator windings 36. The frequency converters 120, 122 can deliver power to the first and second coils 112, 114 positioned on opposing sides of the rotor core 50 to form an electromagnet pair that causes the rotor core 50 to rotate. Because both of the first and second frequency converters 120, 122 are delivering equivalent power to the coil pair 110, the net radial force acting on the rotor core is substantially zero.

FIG. 3b illustrates a configuration where the first frequency converter 120 is offline, malfunctioning or otherwise not delivering power to the stator winding 36 (i.e. $I_1$=0) to the first coil 112, but the second frequency converter 122 is still delivering power at a defined electric current $I_2$ to the second coil 114. In this configuration there is a net force F acting in the direction of arrow 51 pointing towards the second coil 114 that is created due to the lack of power being transmitted through the first coil 112. A radial force (i.e. reluctance force) is generated when there is asymmetry in the electric current flow in stator coils on opposite sides of the rotor. Asymmetry of stator currents on opposite sides of the rotor 50 generates asymmetry in the air gap magnetic flux density which creates a net radial force acting on the rotor. The radial force or reluctance force is a function of the number of turns in the winding, the magnitude of electric current flow, cross-sectional area of the stator core, and the height of the air gap as is known to those skilled in the electrical arts. When the electric motor 10 generates a net radial force that acts on the rotor 50, the design life of certain components such as the bearings can be reduced relative to an ideally functioning electric motor having a negligible net radial force.

FIG. 3c illustrates a stator winding configuration that overcomes problems associated with losing power from one frequency converter during operation of the electrical motor 10. The coil pair 110 can be separated into two separate electrically isolated elements as illustrated. The first coil 112 can include a first element 130 and a second element 132 that are electrically isolated from one another. The second coil 114 can include a first element 134 and a second element 136 that are also electrically isolated from one another. A first frequency converter 120 can be connected to the first element 130 through a winding connection 140 and can be connected in series to the first element 134 of the second coil 114. A second frequency converter 122 can be connected to the second element 132 of the first coil 112 and connected to the second element 136 of the second coil 114 in series through the winding connection 142. In this manner, if one of the first or second frequency converters 120, 122 fail or otherwise go offline, the other frequency converter can drive the rotor core 50 through either of the first paired elements 130, 134 or the second paired elements 132, 136 positioned on opposing sides of the rotor 50. With this novel wiring configuration, one frequency converter can go offline and the other frequency convertor can power the electric motor 10 without generating an undesired radial force in the system. The net radial or reluctance force acting on the rotor 50 continues to be zero under power of only one frequency converter and the electric motor 10 can continue to operate in a substantially similar manner as it is designed to operate with two frequency converters.

Figure 4:
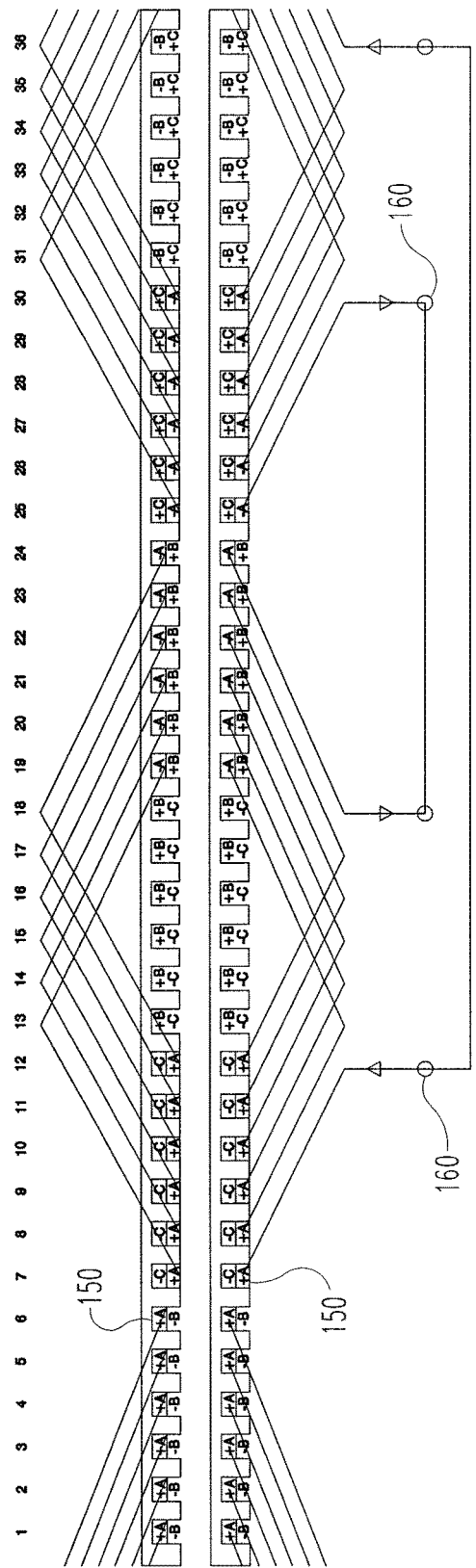
FIG. 4 is a schematic representation of a conventional winding diagram.

Referring now to FIG. 4, a schematic winding diagram for a conventional stator is illustrated. The stator can include a plurality of slots 150 with a dual layer winding represented by two of the letters A, B and/or C in each of the slots. Terminal connections 160 are illustrated and are conventional as one skilled in the art would readily understand.

Figure 5:
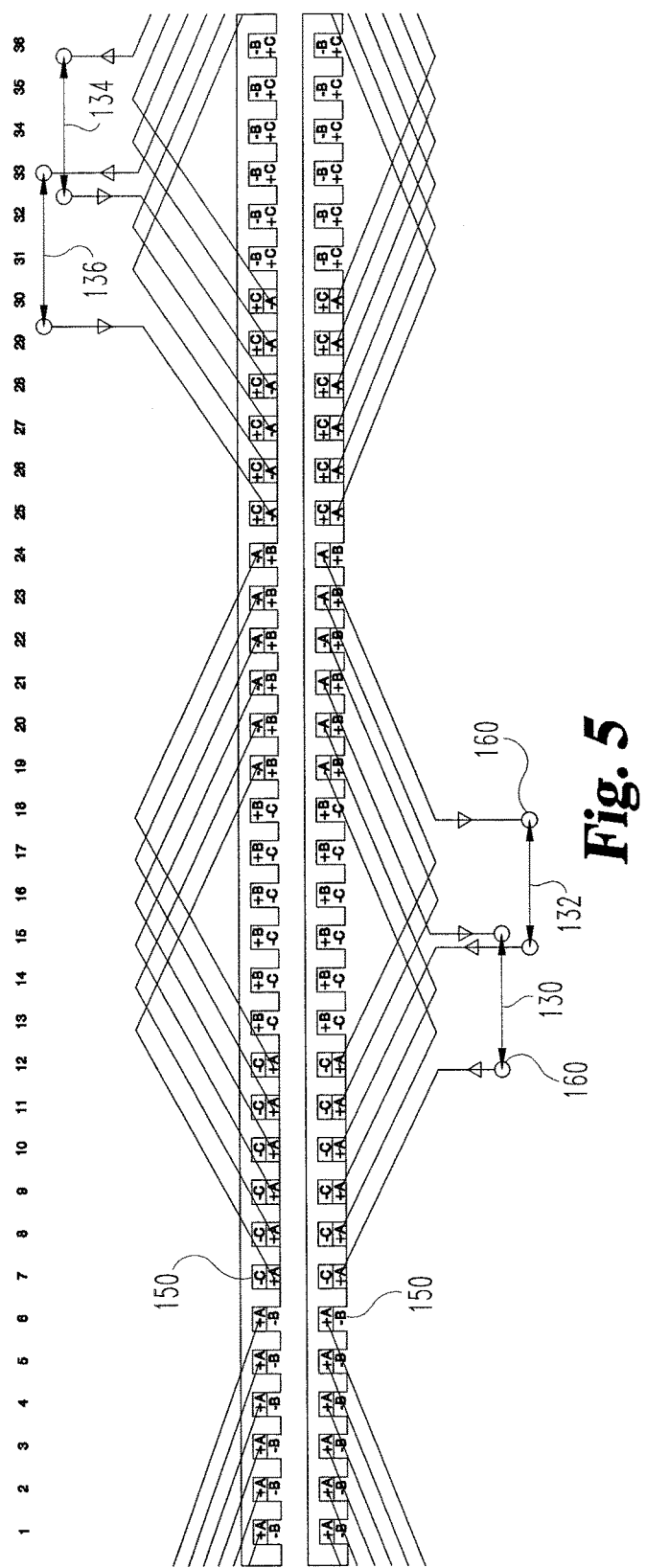
FIG. 5 is a schematic representation of a winding diagram according to one embodiment of the present disclosure.

FIG. 5 shows a winding diagram according to an aspect of the present disclosure. The slots 150 are formed in the stator as is conventional similar to those shown in FIG. 4.

However the winding of FIG. 5 includes electrical series connections between split elements 130, 134 and 132, 136 of the first and second coils 112, 114 respectively (see FIG. 3c). It should be noted that only one phase of the winding diagram are shown in both FIGS. 4 and 5 for clarity and it should be understood that the winding diagram will be modified for a typical three phase winding construction or other configuration as desired.

In one aspect, an electric motor includes a rotor having a rotor core with a rotatable shaft extending therethrough; a stator positioned radially outward of the rotor core, the stator including at least one pair of first and second coils circumferentially positioned on opposing sides of the rotor; wherein each pair of the first and second coils includes first and second elements electronically isolated from one another; a first frequency converter electrically connected to a first conductive wire; a second frequency converter electrically connected to a second conductive wire; wherein the first conductive wire is wound about the first element of the first coil and the first element of the second coil in series; and wherein the second conductive wire is wound about the second element of the first coil and the second element of the second coil in series.

Refining aspects of the electric motor includes the stator having a plurality of paired first and second coils, each of the first and second coils having first and second elements electrically isolated from one another; wherein the frequency convertors are electrically connected in parallel to each of the paired coils; wherein each frequency convertor is electrically connected in series to one of the first and second elements of each of the plurality of paired coils respectively; wherein the motor is operable with one of the first and second frequency convertors powered off; and wherein a net radial force acting on the rotor is substantially zero with one of the first and second frequency convertors powered off.

Another aspect is a method for forming a stator in an electric motor comprising: electrically separating a first winding branch into first and second portions; electrically separating a second winding branch into first and second portions; wherein the first and second winding branches are positioned radially outward of opposing sides of a rotor; electrically connecting a first frequency converter to the first portion of the first winding branch and to the first portion of the second winding branch in series; and electrically connecting a second frequency converter to the second portion of the first winding branch and to the second portion of the second winding branch in series.

Refining aspects of the method includes forming a plurality of first and second winding branches separated into first and second electrically isolated portions; routing the plurality of the first and second winding branches to distal ends of a motor housing, respectively; operating the electric motor on only one frequency converter; and wherein the net radial force acting on the rotor is substantially zero when only one frequency converter is providing electrical power.

Another aspect includes an electric motor comprising a stator having a pair of coils positioned on opposing sides of a rotor; coil windings separated into two parallel branches electrically isolated from one another and wound about corresponding stator cores; a pair of electrically isolated elements defined by each coil; wherein each of the two parallel branches are wound about the first and second elements of each coil; and wherein first elements of each of the paired coils are electrically connected together in series and second elements of each of the paired coils are connected together in series with corresponding coil windings.

Refining aspects of the electric motor includes a first frequency converter electrically connected to each of the first elements by wire windings in series; a second frequency converter electrically connected to each of the second elements by wire windings in series; a rotor positioned radially inward of the stator; wherein the electric motor is operable with one frequency converter to provide electrical power to one of the plurality of elements connected in series without generating an unbalanced radial force on the rotor; a motor housing having two sets of electrical cables; wherein the first cable set is engaged through a first end of the housing and the second set is engaged through a second end of the housing; wherein outputs of the parallel windings of the stator are divided and routed to either end of a motor housing to connect with a corresponding cable set; wherein the stator coils include three coils, each coil split into first and second elements; one or more cooling fluid passages formed in the stator; and at least one shaft bearing for rotatably supporting a shaft with a motor housing.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An electric motor comprising: a rotor having a rotor core with a rotatable shaft extending therethrough; a stator positioned radially outward of the rotor core, the stator including at least one pair of first and second coils circumferentially positioned on opposing sides of the rotor; wherein each pair of the first and second coils includes first and second elements electronically isolated from one another; a first frequency converter electrically connected to a first conductive wire; a second frequency converter electrically connected to a second conductive wire; wherein the first conductive wire is wound about the first element of the first coil and the first element of the second coil in series; and wherein the second conductive wire is wound about the second element of the first coil and the second element of the second coil in series; and
    wherein a net radial force acting on the rotor is substantially zero with one of the first and second frequency convertors powered off.

2. The electric motor of claim 1, wherein the stator includes a plurality of paired first and second coils, each of the first and second coils having first and second elements electrically isolated from one another.

3. The electric motor of claim 2, wherein the frequency convertors are electrically connected in parallel to each of the paired coils.

4. The electric motor of claim 2, wherein each frequency convertor is electrically connected in series to one of the first and second elements of each of the plurality of paired coils respectively.

5. The electric motor of claim 1, wherein the motor is operable with one of the first and second frequency convertors powered off.

6. A method for forming a stator in an electric motor comprising: electrically separating a first winding branch into first and second portions; electrically separating a second winding branch into first and second portions; wherein the first and second winding branches are positioned radially outward of opposing sides of a rotor; electrically connecting a first frequency converter to the first portion of the first winding branch and to the first portion of the second winding branch in series; and electrically connecting a second frequency converter to the second portion of the first winding branch and to the second portion of the second winding branch in series, such that wherein a net radial force acting on the rotor is substantially zero with one of the first and second frequency convertors powered off.

7. The method of claim 6 further comprising: forming a plurality of first and second winding branches separated into first and second electrically isolated portions.

8. The method of claim 7, further comprising: routing the plurality of the first and second winding branches to distal ends of a motor housing, respectively.

9. The method of claim 6 further comprising: operating the electric motor on only one frequency converter.

10. The method of claim 6, wherein the net radial force acting on the rotor is substantially zero when only one frequency converter is providing electrical power.

11. An electric motor comprising:
a stator having a pair of coils positioned on opposing sides of a rotor; coil windings separated into two parallel branches electrically isolated from one another and wound about corresponding stator cores; a pair of electrically isolated elements defined by each coil; wherein each of the two parallel branches are wound about the first and second elements of each coil; and wherein first elements of each of the paired coils are electrically connected together in series and second elements of each of the paired coils are connected together in series with corresponding coil windings;
a first frequency converter electrically connected to each of the first elements by wire windings in series; and a second frequency converter electrically connected to each of the second elements by wire windings in series;
a rotor positioned radially inward of the stator; and
wherein the electric motor is operable with one frequency converter to provide electrical power to one of the plurality of elements connected in series without generating an unbalanced radial force on the rotor.

12. The electric motor of claim 11, further comprising: a motor housing having two sets of electrical cables; wherein the first cable set is engaged through a first end of the housing and the second set is engaged through a second end of the housing.

13. The electric motor of claim 12, wherein outputs of the parallel windings of the stator are divided and routed to either end of a motor housing to connect with a corresponding cable set.

14. The electric motor of claim 11, further comprising a plurality of coils, each of the plurality of coils split into first and second elements.

15. The electric motor of claim 11, further comprising: one or more cooling fluid passages formed in the stator.

16. The electric motor of claim 11, further comprising: at least one shaft bearing for rotatably supporting a shaft with a motor housing.

* * * * *